Patented Nov. 8, 1927.

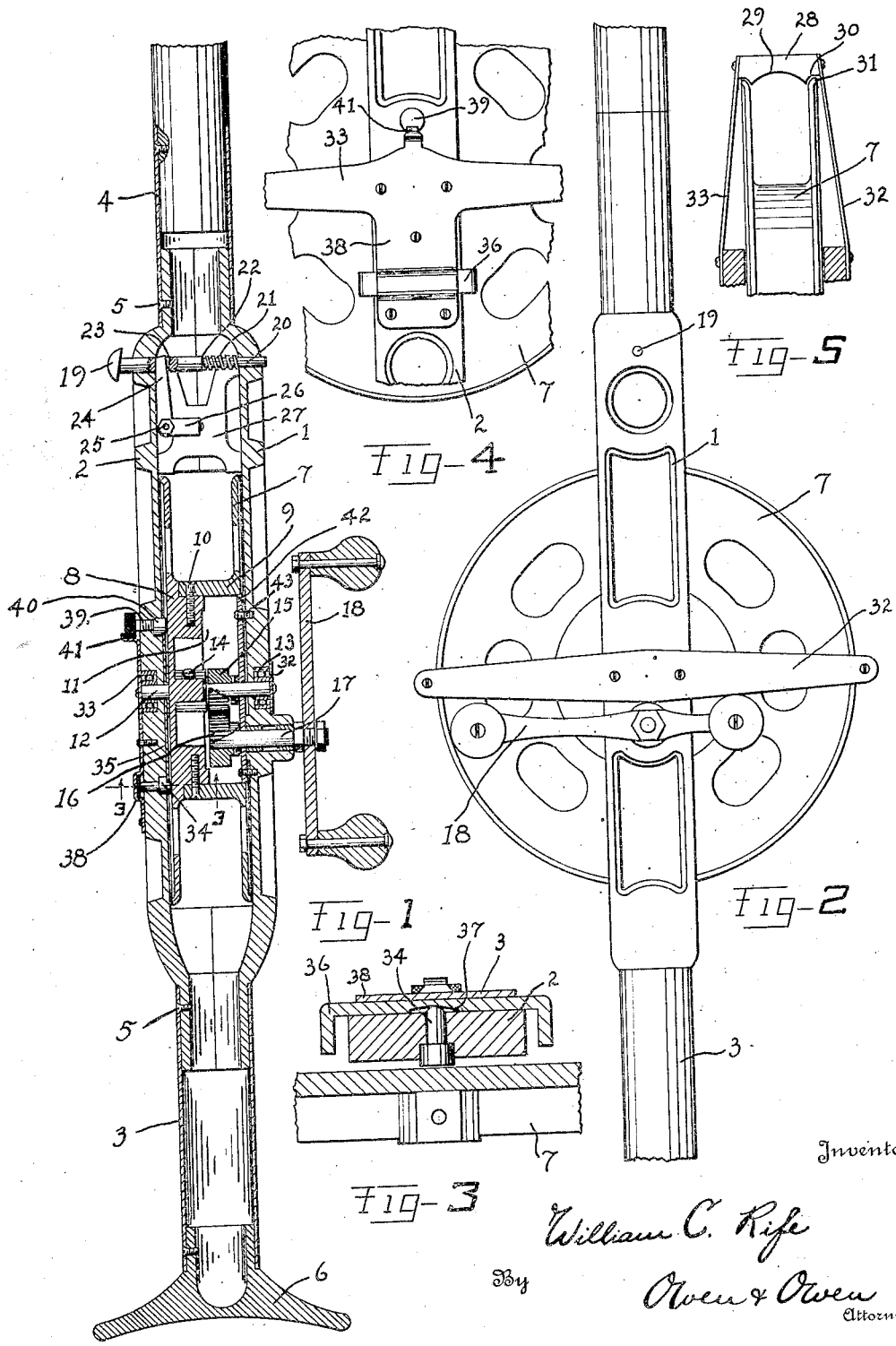

1,648,824

UNITED STATES PATENT OFFICE.

WILLIAM C. RIFE, OF TOLEDO, OHIO.

FISHING REEL.

Application filed February 21, 1927. Serial No. 169,785.

This invention relates to fishing devices, and the objects are to provide a fishing pole having the new and improved features of construction and arrangement and assembly hereinafter described; to provide a reel for fishing poles which may be cheaply manufactured and conveniently assembled and disassembled, is sturdy in construction and efficient in operation; to provide a winding reel for fishing poles in combination with novel brake and drag means, therefor, conveniently positioned for manipulation and having novel features of construction and operation; to provide a device of the above character having unique features of arrangement and construction hereinafter more fully described.

The invention is shown by way of illustration in the accompanying drawings, in which:

Fig. 1 is a longitudinal sectional elevation of the fishing pole showing the reel construction and associated features; Fig. 2 is a side elevation of the construction shown in Fig. 1; Fig. 3 is a sectional view on the line 3—3 of Fig. 1; Fig. 4 is a fragmentary elevation of the other side of the reel from that shown in Fig. 2, and Fig. 5 is a sectional view showing the guard for the winding reel.

The illustrated embodiment of the invention comprises a fishing pole having a pair of panels 1 and 2 having spaced intermediate portions and with the end portions thereof in engagement. The end portions of the panels 1 and 2 in assembled relation are tubular in form, and fitting over these end portions are tubes 3 and 4 which hold the panels in assembled relation. A single screw 5 for each tube 3 and 4 connects the respective tube to the adjacent panel, and in this manner the panels are securely held in assembled relation, but may be readily and conveniently disassembled by merely unscrewing the screws 5 and sliding the tubes 3 and 4 from engagement with the respective panel end portions. A rest 6 is suitably connected to the tube 3 so that the pole may be supported against the body when used for deep water fishing, and it will be understood that other sections may be connected to the tube 4 in order to extend the length of the pole to the desired distance.

Positioned within the intermediate spaced portion of the panels 1 and 2 is a winding drum 7 on which the fishing line is wound. The winding drum 7 is formed in two parts, the part 8 and the part 9 which telescopes over the part 8, and is held in assembled position by screws 10. This facilitates manufacture, and provides a relatively inexpensive but durable and efficient construction. The part 9 of the winding reel consists of an annulus and a radially projecting flange, and when the parts are in assembled relation they provide a recess or opening 11 in the central portion of the reel.

The winding reel 7 is mounted on a shaft 12 mounted in suitable ball bearings 13 at opposite ends thereof in the respective panels 1 and 2. The part 8 of the winding reel is fixed to the shaft 12 to rotate therewith by means of a screw 14, to which access may be readily had when it is desired to disassemble the parts as will hereinafter appear.

Fixed to the shaft 12 is a gear 15 with which meshes a gear 16 on a shaft 17 journaled in the panel 1. Attached to the outer end of the shaft 17 and for rotation therewith is an operating handle 18. It will be obvious that by rotation of the handle 18 the winding drum 7 is conveniently rotated in the desired direction.

For applying a braking force to the periphery of the winding reel 7, a button 19 is positioned to one side of the panel 1. The button 19 is carried by a stem 20 extending transversely of the panels, and is held in its outward position by means of a coiled spring 21 encircling the stem 20, the spring bearing against the inside of the panel 1 at one end and against the shoulder 22 on the stem 20 at the opposite end. Formed in the stem 20 adjacent the panel 2 is a slot 23 into which an arm 24 of a bell crank lever projects. The bell crank lever is pivoted at 25, and its other arm 26 is provided with a pin which loosely engages a brake shoe 27, the lower end of which is adapted to engage the peripheral portion of the winding reel. It will be seen that by pushing the button 19 inwardly the brake shoe 27 is forced into engagement with the winding reel or drum and exerting a braking force thereagainst. Upon releasing the button 19 the brake shoe 27 is moved away from the winding drum by means of the coiled spring 21.

For preventing the line from becoming disengaged from the winding drum, guide members 28 are disposed over the periphery of the drum 7 in diametrically opposed relation. The inside of the members 28 are arcuately shaped, as indicated at 29, and the edge portions are cut away as indicated at 30 to receive the outturned edges 31 of the winding drum flanges. The guide members 28 are attached to plates 32 and 33 connected by screws to the panels 1 and 2.

For exerting a dragging force against the side of the drum 7 to prevent the line from being fed too rapidly, a pin 34 is slidable in the panel 2, and is arranged to engage the side of the drum. Normally the pin 34 is held out of engagement with the drum 7 by a flat leaf spring 35. For actuating the pin 34 a substantially U-shaped slide 36 extends across the panel 2, and is formed with a groove 37 intermediate the ends thereof. One end of the pin 34 extends into the groove 37. It will be noted that the groove is deeper at one end than at the other so that when the slide member is moved into one direction, the pin 34 will be forced into engagement with the drum 7 with greater force than when the slide is moved to the other direction. For guiding the movement of the slide member 36, a lateral extension 38 on the plate member 33 extends over the slide member, as clearly indicated in Fig. 1.

Under some conditions it is advisable to use a screw 39 engaging a drag member 40 for creating a dragging force on the drum. As shown, the screw 39 is threaded into the panel 2, and is prevented from being unscrewed or separated from the panel 2 by means of a lip 41 integral with the plate 33 and overhanging the outer end of the screw.

The outer end of the opening 11 in the winding drum 7 is closed by a plate 42, which is attached to the panel 1 by screws 43. In disassembling the above described construction, the screws 5 are removed to enable the tubes 3 and 4 to be disengaged from the panels. Thereafter by disengaging the panel 1 from the panel 2, the plate 42 is removed as well as the operating shaft 17 and gear 16 so as to permit ready access to the working parts of the reel for inspection or repair.

While I have shown a construction which is the best form known to me at the present time, numerous changes in details of construction, arrangement, size and operation may be effected without departing from the spirit of the invention, especially as defined in the appended claims.

What I claim as new and desire to secure by Letters Patent is:

1. A fishing reel comprising a pair of elongate panels spaced apart intermediate their ends, a drum rotatable in said spaced portion and having an opening in one side thereof, means located in said opening for rotating said drum, a plate closing the outer end of said opening, and means for attaching said plate to the adjacent panel, whereby upon separation of said panels, said plate is removed from the drum.

2. A fishing reel comprising a pair of panels spaced apart intermediate the ends thereof, a winding drum rotatable in said spaced portion, said drum having an opening at one side thereof, means carried by one of the panels and arranged within said opening for rotating the drum, a plate closing one side of said opening, and means for attaching said plate to the adjacent panel, whereby separation of said panel from the other panel removes the drum rotating mechanism and plate to permit ready access to the interior of said drum.

3. A fishing reel comprising a pair of panels having their intermediate portions spaced from each other, a winding drum rotatable in said spaced portion, a brake engageable with the periphery of said drum including a transverse reciprocable pin operable from the outside of one panel and a pivoted braking member actuated by said pin, and means for rotating said drum operable from the outside of the other panel.

4. A fishing reel having a frame, a winding reel on said frame, a pin slidable in said frame and engaging one side of said drum, and a slide having a grooved portion engaging said pin, one portion of said groove being deeper than the other, whereby adjustment of said slide actuates said pin into engagement with the drum with greater or less friction.

5. A fishing reel having a pair of elongate panels spaced apart intermediate the ends thereof, a winding reel in said spaced portion, means for detachably holding said panels together, a plate attached to each panel and disposed transversely thereof, block means attached to opposite ends of said panels shaped to fit over the periphery of said reel thereby to prevent disengagement of the line from the reel.

6. A fishing reel having a pair of elongate panels spaced apart intermediate the ends thereof, means to detachably connect the ends of the panels together, a reel mounted for rotation in said spaced portion and consisting of separable telescoping parts, one part being formed with a central opening, gear mechanism within said opening for rotating said reel, a plate closing said opening, and means to attach said plate to the adjacent panel.

7. A fishing reel having a pair of elongate panels spaced apart intermediate the ends thereof, means to detachably connect the ends of said panels together, a drum mounted for rotation in said spaced portion and consisting of separable parts, one part comprising an annulus and projecting flange and in telescoping engagement with the other part, a shaft fixed to said other part, a pinion on said shaft, a shaft projecting through the panel adjacent said last shaft and having a pinion in mesh with said first pinion, and a handle on the outer end of said last shaft for rotating said drum.

In testimony whereof I have hereunto signed my name to this specification.

WILLIAM C. RIFE.